(12) United States Patent
Lee

(10) Patent No.: US 7,962,167 B2  
(45) Date of Patent: *Jun. 14, 2011

(54) TRANSMISSION POWER CONTROL METHOD OF UPLINK PACKET DATA TRANSMISSION

(75) Inventor: Jinsock Lee, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/548,009

(22) Filed: Aug. 26, 2009

(65) Prior Publication Data

US 2009/0316663 A1 Dec. 24, 2009

Related U.S. Application Data

(63) Continuation of application No. 10/591,813, filed as application No. PCT/JP2005/010249 on Jun. 3, 2005, now Pat. No. 7,613,474.

(30) Foreign Application Priority Data

Jun. 17, 2004 (JP) ................................. 2004-179831

(51) Int. Cl.
  *H04B 7/00* (2006.01)
  *H04W 36/00* (2009.01)

(52) U.S. Cl. .......... 455/522; 455/69; 455/442; 370/318; 370/331

(58) Field of Classification Search .................... 455/69, 455/522, 442; 370/318, 331
See application file for complete search history.

(56) References Cited

U.S. PATENT DOCUMENTS

| | | | |
|---|---|---|---|
| 6,650,905 B1 | 11/2003 | Toskala et al. | |
| 7,010,317 B2 | 3/2006 | Hwang et al. | |
| 7,197,021 B2 | 3/2007 | Seo et al. | |
| 7,428,424 B2 | 9/2008 | Hwang et al. | |
| 7,613,474 B2 * | 11/2009 | Lee ............................... | 455/522 |
| 2002/0034170 A1 | 3/2002 | Tiedemann et al. | |
| 2003/0039217 A1 | 2/2003 | Seo et al. | |
| 2003/0108013 A1 | 6/2003 | Hwang et al. | |

(Continued)

FOREIGN PATENT DOCUMENTS

JP 2001-358651 12/2001

(Continued)

OTHER PUBLICATIONS

3GPP TR 25.896 V1.2.1 (Jan. 2004), Technical Report, 3rd Generation Partnership Project; Technical Specification Group Radio Access Network; Feasibility Study for Enhanced Uplink for UTRA FDD; (Release 6).

(Continued)

*Primary Examiner* — Duc M Nguyen
(74) *Attorney, Agent, or Firm* — Scully, Scott, Murphy & Presser, P.C.

(57) ABSTRACT

A mobile station (MS) transmits a first data flow to a first group of base stations with a first power offset, transmits a second data flow to a second group of base stations, and further transmits a pilot signal. A radio network controller (RNC) controls the power of the pilot signal power based on reception errors of the second data flow, calculates the first power offset based on signaled required level of the first power offset from base stations (BTS) of the first group which calculate the required level of the first power offset based on an occurrence of retransmission, and signals the calculated first power offset to the mobile station.

3 Claims, 6 Drawing Sheets

U.S. PATENT DOCUMENTS

| | | |
|---|---|---|
| 2004/0162098 A1 | 8/2004 | Wei et al. |
| 2004/0203980 A1 | 10/2004 | Das et al. |
| 2004/0218533 A1 | 11/2004 | Kim et al. |
| 2004/0248606 A1 | 12/2004 | Suzuki et al. |
| 2005/0043051 A1 | 2/2005 | Takano et al. |
| 2009/0325627 A1* | 12/2009 | Lee ............................... 455/522 |

FOREIGN PATENT DOCUMENTS

| | | |
|---|---|---|
| JP | 2001-359135 | 12/2001 |
| JP | 2003-504980 | 2/2003 |
| JP | 2003-134046 | 5/2003 |
| JP | 2003-348012 | 12/2003 |
| JP | 2004-40187 | 2/2004 |
| JP | 2004-64142 | 2/2004 |
| WO | WO 03/028388 A2 | 4/2003 |
| WO | WO 03/043224 A1 | 5/2003 |
| WO | WO 2005/050900 A1 | 6/2005 |

OTHER PUBLICATIONS

3GPP TS 25.214 V5.6.0 (Sep. 2003), Technical Report, 3rd Generation Partnership Project; Technical Specification Group Radio Access Network; Physical Layer Procedures (FDD) (Release 5).

* cited by examiner

TRANSMISSION POWER CONTROL METHOD OF UPLINK PACKET DATA TRANSMISSION

CROSS REFERENCE TO RELATED APPLICATION

This application is a continuation of U.S. application Ser. No. 10/591,813, filed on Sep. 6, 2006, which is the National Phase of PCT/JP2005/10249 filed on Jun. 3, 2005.

TECHNICAL FIELD

This invention is related to uplink data packet transmission in wideband code division multiple access (WCDMA) technology. Furthermore, in particular, this invention is closely related to enhancement of uplink dedicated transport channel (EUDCH). Aiming to improve the transmission efficiency of uplink packet, the EUDCH includes new base station functions such as fast retransmission and scheduling of uplink data packet data.

BACKGROUND ART

In a WCDMA system, the radio network controller (RNC) controls the data rate of uplink packet data transmission for a multiplicity of mobile stations (MS). The radio network controller scheduling of the uplink data rate can be combined with base station (BTS) scheduling in order to achieve better radio link efficiency and therefore higher system capacity. One example of this combination of the RNC and BTS packet scheduling is the so-called Enhanced Dedicated Channel (EUDCH). We refer here to 3GPP TR 25.896 V1.2.1 (2004-01), Technical Report of 3GPP (3rd Generation Partnership Project).

In addition to packet scheduling capability at a base station, EUDCH considers a base station to have ARQ (automatic retransmission) capability in order to request retransmission of an erroneous data packet directly to the mobile station without the involvement of the radio network controller. Generally, BTS ARQ is much faster than RNC ARQ, hence the former outperforms the latter in terms of its required delay for retransmission.

When a mobile station has multiple uplink data flows, it is possible to use a different scheduling method for the different data flow depending on the requirement of the flow. For example, if the BTS scheduling is optimized for mainly a best-effort service while a voice call service can be better controlled by the RNC scheduling, the mobile station is able to transmit multiple data flows using appropriate scheduling mode to meet the requirement of each data flow.

FIG. 1 gives an illustration of a system with the BTS/RNC scheduling and ARQ. Three types of mobile stations (MS1 to MS3) 101 to 103 in a cell are connected to base station (BTS) 104 which is controlled by radio network controller (RNC) 105. Two mobile stations (MS2, MS3) 102, 103, which are denoted as "BtsSch," are BTS scheduled mobile stations while two mobile stations (MS1, MS3) 101, 103, which are denoted as "RncSch," are scheduled by radio network controller 105. Note that MS3 103 has two data flows and each flow has a different scheduling mode, i.e., BtsSch and RncSch. In other words, MS3 103 has two uplink data flows while each of MS1 101 and MS2 102 has one uplink data flow. Hence the data rate of MS2 102 and the data rate of the first flow of MS3 103 are controlled by base station 104 while radio network controller 105 controls the data rate of MS1 101 and the data rate of the second flow of MS3 103. Similarly, the retransmission of MS2 102 and the retransmission of the first flow of MS3 103 are requested by the base station while the radio network controller controls the retransmission of MS1 101 and the retransmission of the second flow of MS3 103. It is important to note that MS1 101 is connected to both base stations 104, 104A at the same time and radio network controller 105 combines received data packets from two base stations 104, 104A.

When a mobile station transmits two data packet flows using both the BTS and RNC scheduling simultaneously, assuming the user is making a voice call while sending a multimedia message, the transmission power of two data flows should be appropriately controlled. In the example of the aforementioned EUDCH, the transmission power of two data flows, denoted by DCH (dedicated channel) and EUDCH (enhanced dedicated channel), can be conventionally controlled in the following manner:

$$P_{cch}(t) = P_{cch}(t-1) + \Delta_{cch}(t)$$

$$P_{dch}(t) = PO_{DCH} P_{cch}(t)$$

$$P_{eudch}(t) = PO_{EUDCH} P_{cch}(t) \quad (1)$$

where $PO_{DCH}$ and $P_{dck}(t)$ are the transmission power offset and transmission power at time t of DCH (RNC scheduled data flow) while $PO_{EUDCH}$ and $P_{eudch}(t)$ are those of EUDCH (BTS scheduled data flow). The power offsets of DCH and EUDCH are controlled in a semi-static manner by the radio network controller while the transmission power of pilot signal $P_{cch}(t)$ is controlled by both inner and outer loop control. More specifically, $\Delta_{cch}(t)$ composes of inner and outer loop adjustment factors. We refer both adjustment algorithms included in 3GPP TS 25.214 V5.6.0 (2003-09), Technical Report of 3GPP (3rd Generation Partnership Project).

The literatures cited in this description will be listed below:

[1] 3GPP TR 25.896 V1.2.1 (2004-01) Technical Report 3rd Generation Partnership Project; Technical Specification Group Radio Access Network; Feasibility Study for Enhanced Uplink for UTRA FDD; (Release 6)

[2] 3GPP TS 25.214 V5.6.0 (2003-09) Technical Report 3rd Generation Partnership Project; Technical Specification Group Radio Access Network; Physical layer procedures (FDD) (Release 5)

DISCLOSURE OF THE INVENTION

Problems to be Solved by the Invention

When the base station level ARQ is enabled, the control of the transmission power shown in Equation (1) has the following problems to be solved:

Interaction of Power Control and BTS ARQ:

When a base station controls an ARQ process, the radio network controller should set an appropriate power offset for a BTS scheduling data packet (EUDCH data flow). If the power offset is set too large, a very low error probability can occur so that there is no benefit of having the base station level ARQ processing. If the power offset is set too low, a large error probability would increase the total latency of the uplink data packet transmission. To make this problem more difficult, if the data packet frame lengths of DCH and EUDCH are different, the radio network controller should also anticipate a difference in interleaving gain of DCH and EUDCH. For example, if the moving speed of the mobile station changes randomly in time, so does the interleaving gain of DCH and EUDCH.

(2) Interaction of Power Control and Soft Handover in Uplink:

The transmission power control for DCH and EUDCH data flows should enable high link efficiency even when there is a difference of soft handover gain of DCH and EUDCH. For example, when a DCH data flow is received by two base stations while only one base station receives an EUDCH data flow, the transmission power control should control the transmission power of both DCH and EUDCH in a "simultaneously efficient" way. If it optimizes for only either one of DCH and EUDCH, the link quality on the other channel would degrade. To make the problem more difficult, the number of base stations receiving the DCH and EUDCH data flows changes randomly and frequently as the mobile station moves around the network.

The object of the present invention is to provide a transmission power control method which can simultaneously achieve efficient transmission of each of a plurality of data flows.

Means for Solving Problem

According to the first aspect of the invention, a method of controlling transmission power in a mobile communication system which has a plurality of mobile stations, a plurality of base stations, and a radio network controller includes the steps of: a mobile station transmitting a first data flow to a base station of a first group with a first power offset to a pilot signal, and transmitting a second data flow to a base station of a second group; the base station of the first group controlling retransmission of the first data flow, calculating required level of the first power offset based on an occurrence of retransmission, and signaling the required level to the radio network controller; the base station of the second group receiving the second data flow, and sending the received second data flow to the radio network controller; the radio network controller combining the second data flow sent from the base station of the second group, controlling the pilot signal power based on a reception error of the second data flow, calculating the first power offset based on the signaled required level of the first power offset, and signaling the calculated first power offset to the mobile station; and the mobile station updating the first power offset to the signaled first power offset.

According to the second aspect of the invention, a method of controlling transmission power in a mobile communication system which has a plurality of mobile stations, a plurality of base stations, and a radio network controller includes the steps of: the mobile station transmitting a first data flow to a base station of a first group with a first power offset to a pilot signal, and transmitting a second data flow to a base station of a second group; the base station of the first group controlling retransmission of the first data flow, calculating required level of the first power offset based on a target error rate of the first data flow, and signaling the required level to the radio network controller; the base station of the second group receiving the second data flow, and sending the received second data flow to the radio network controller; the radio network controller combining the second data flow sent from the base station of the second group, controlling the pilot signal power based on a target error rate of the second data flow, receiving the required level of the first power offset from the base station of the first group, calculating the first power offset based on the signaled required level of the first power offset in response to the required level of the first power offset from a responsible base station, increasing the power offset based on high priority or high delay sensitivity of the first data flow, signaling the calculated first power offset to the mobile station, and signaling the calculated first power offset to the base station of the first group; and the mobile station updating the first power offset to the signaled first power offset, wherein the responsible base station for the mobile station is a base station in the first group receiving the first data flow correctly, and most frequently, than other base stations in the group.

According to the third aspect of the invention, a method of controlling transmission power in a mobile communication system which has a plurality of mobile stations, a plurality of base stations, and a radio network controller, includes the steps of: a mobile station transmitting a first data flow to a bas station of a first group with a first power offset to a pilot signal, transmitting a second data flow to a base station of a second group, and transmitting, in addition to the first data flow, a third data flow to the first group with a second power offset to the pilot signal; the mobile station choosing transmission of either first or third data flow in a time interval but not simultaneously together; the base station of the first group controlling retransmission of both the first data flow and the third data flow, separately calculating required level of the first and second power offsets based on an occurrence of retransmission of the first and third data flows, respectively, and signaling the two required levels to the radio network controller; the base station of the second group receiving the second data flow, and sending the received second data flow to the radio network controller; the radio network controller combining the second data flow sent from the base station of the second group, controlling the pilot signal power based on a reception error of the second data flow, calculating the first and second power offsets based on the signaled required levels of the first and second power offsets, respectively, and signaling the calculated first and second power offsets to the mobile station; the mobile station updating the first and second power offsets to the signaled first and second power offsets, respectively.

According to the fourth aspect of the invention, a method of controlling transmission power in a mobile communication system which has a plurality of mobile stations, a plurality of base stations, and a radio network control station, includes the steps of: a mobile station transmitting a first data flow to base station of a first group, transmitting a second data flow to a base station of a second group, and transmitting a pilot signal; determining a transmission power of the first data flow by using a first power offset to the pilot signal; setting the first power offset in accordance with retransmission status of the first data flow at the base station of the first group; notifying a corresponding mobile station of the first power offset that has been set; and controlling a transmission power of the pilot signal so that reception quality at the base station of the second group comes to a prescribed target quality.

Advantageous Effect of the Invention

The present invention solves the problem related to fast change of a difference in the interleaving gain between two data flows due to a different frame length of two flows. When two data flows have a different frame length, the conventional technique allow to adjust the transmission power of both flows only optimized for either one of the data flows hence inefficient for the other flow. The present invention adjusts the transmission power of each data flow, simultaneously, to meet efficiency of respective data flows. This benefit is explained in FIG. 2, using an example of an EUDCH system, that the transmission power of a DCH data flow is controlled based on the reception status at the radio network controller while the transmission power of the EUDCH data flow is controlled based on the reception status at the base station.

In addition, the present invention solves the problem related to fast change of difference in macro-diversity gain between two data flows due to a different number of receiving base stations of two flows. When two data flows have a different number of the receiving base stations, the conventional technique allow only to adjust the transmission power of both flows only optimized for either one of the data flows hence inefficient for the other flow. According to the present invention, the transmission power of each data flow is adjusted simultaneously to meet efficiency of respective data flow. This benefit is explained in FIG. 2 and FIG. 5 described later, using an example of the EUDCH system. The transmission power of the DCH data flow is controlled based on the combined reception status at the radio network controller, after receiving the DCH data flow by a group of base stations, while the transmission power of the EUDCH data flow is controlled based on the reception status at the second group of base stations.

Figure 1:
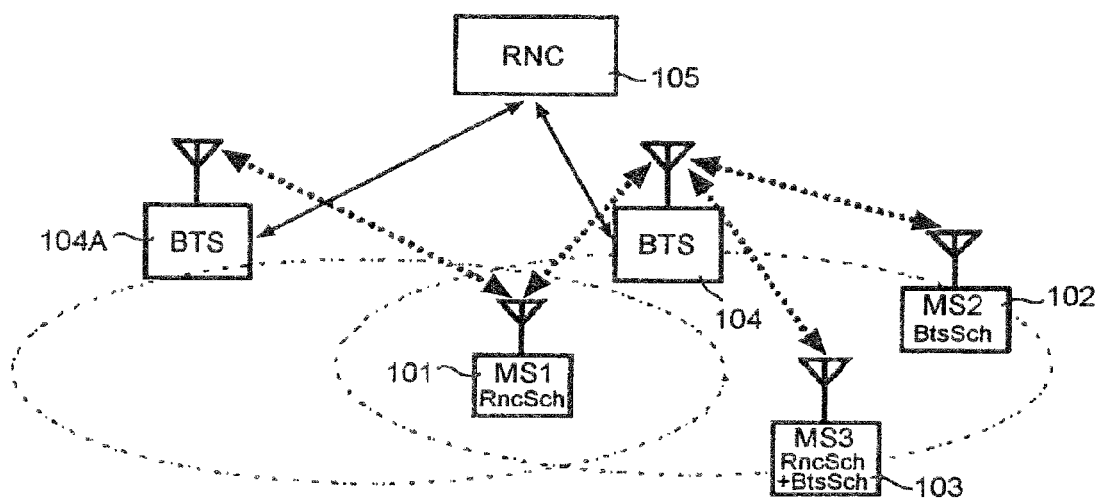
FIG. 1 is a block diagram illustrating a system with RNC scheduling and BTS scheduling uplink data packet transmission.

DESCRIPTION OF THE REFERENCE NUMERALS 10, 101, 102, 103 Mobile station (MS)
20, 104, 104A Base station (BTS)
30, 105 Radio network controller (RNC)
201 CCH pilot transmitter
202 DCH data frame transmitter
203, 601, 602 EUDCH data frame transmitter
204, 603 Power offset controller
205 Inner loop power controller
206, 207, 605 ARQ transmitter
208 Data frame demultiplexer
209 Pilot signal receiver
210 DCH frame decoder
211, 606 EUDCH frame decoder
212 Downlink TPC command generator
213, 215, 609 ARQ receiver for EUDCH data frame
214, 607, 608 Power offset estimator
216 Outer loop TPC controller
217 DCH frame receiver
218 EUDCH frame receiver
219, 610 Radio resource controller
604 Time multiplexer

BEST MODE FOR CARRYING OUT THE INVENTION

Figure 2:
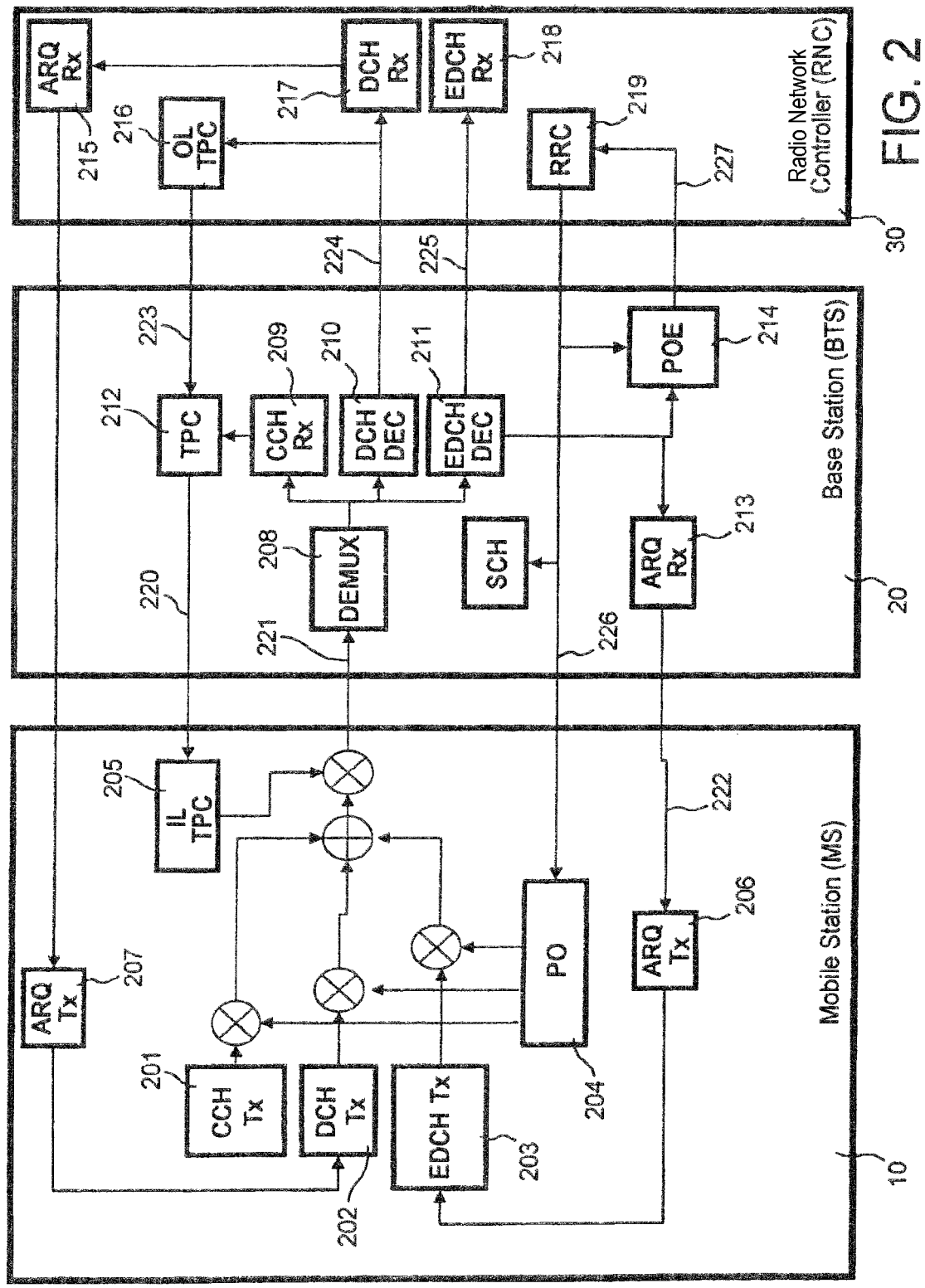
FIG. 2 is a block diagram illustrating a system according to an embodiment of the present invention.

FIG. 2 illustrates one possible realization of the system according to the present invention including RNC/BTS ARQ and transmission power control. As an example, aforementioned EUDCH is considered and the illustrated system comprises one mobile station (MS) 10, one base station (BTS) 20 and one radio network controller (RNC) 30.

Mobile station 10 is provided with CCH pilot transmitter (CCH Tx) 201, DCH data frame transmitter (DCH Tx) 202, EUDCH data frame transmitter (EDCH Tx) 203, power offset controller (PO) 204, inner loop power controller (IL IPC) 205, ARQ transmitter (ARQ Tx) 206 for EUDCH data frame, and ARQ transmitter (ARQ Tx) 207 for DCH data frame. The mobile station transmits the common pilot signal CCH generated by transmitter 201, the RNC scheduled DCH data flow generated by transmitter 202, and the BTS scheduled EUDCH data flow generated by transmitter 203. Respective power offsets of each flow are controlled by power offset controller 204 and these data flows are combined as a transmission signal of mobile station 10. Inner loop power controller 205 controls the total transmission power of mobile station 10 (see Equation (1)). Uplink data transmission 221 between mobile station 10 and base station 20 is established.

Base station 20 is provided with data frame demultiplexer (DEMUX) 208, pilot signal receiver (CCH Rx) 209, DCH frame decoder (DCH DEC) 210, EUDCH frame decoder (EDCH DEC) 211, downlink TPC command generator (TPC) 212, ARQ receiver (ARQ Rx) 213 for EUDCH data frame, and power offset estimator (POE) 214.

Radio network controller 30 is provided with ARQ receiver (ARQ Rx) 215 for DCH data frame, outer loop TPC controller (OL TPC) 216, DCH frame receiver (DCH Rx) 217, EUDCH frame receiver (EDCH Rx) 218, and radio resource controller (RRC) 219.

The base station receives both transmitted data flows and demultiplexes them into separate processing chains by demultiplexer 208. Firstly, CCH is decoded by decoder 209 and processed by downlink TPC command generator 212, which generates power control commands (downlink TPC commands) 220. Commands 220 are sent to inner loop power controller 212 in mobile station 10. The RNC scheduled DCH flow is decoded by decoder 210, and decoded RNC scheduled DCH flow 224 is then forwarded to radio network control unit 217 at radio network controller 30 via a BTS-RNC interface. The retransmission controller, i.e., ARQ receiver 215, at radio network controller 30 requests erroneous DCH data packets back from the mobile station by notifying ARQ transmitter 207 at mobile station 10. Also, the reception status of DCH is used by outer loop power controller 216, which controls the target signal-to-noise ratio (SIR) 223 of the base station power controller, i.e., TPC command generator 212, via a control signaling interface. The decoding of the BTS scheduled EUDCH data packet is performed by EUDCH decoder 211, and decoded EUDCH data frame 225 is forwarded to EUDCH frame receiver 218 at radio network controller 30. EUDCH decoder 211 forwards the reception status of EUDCH to the retransmission slave controller, i.e., ARQ receiver 213, located in base station 10. ARQ receiver 213 communicates with the retransmission master controller, i.e., ARQ transmitter 206, at mobile station 10 as illustrated by downlink ARQ feedback 222. For further details of the system shown in FIG. 2, we refer to 3GPP TR 25.896 V1.2.1 (2004-01) and 3GPP TS 25.214 V5.6.0 (2003-09). It should be noted that it is possible to dispose power offset estimator (POE) 214 in radio network controller 30 instead of disposing it in base station 20.

Figure 3:
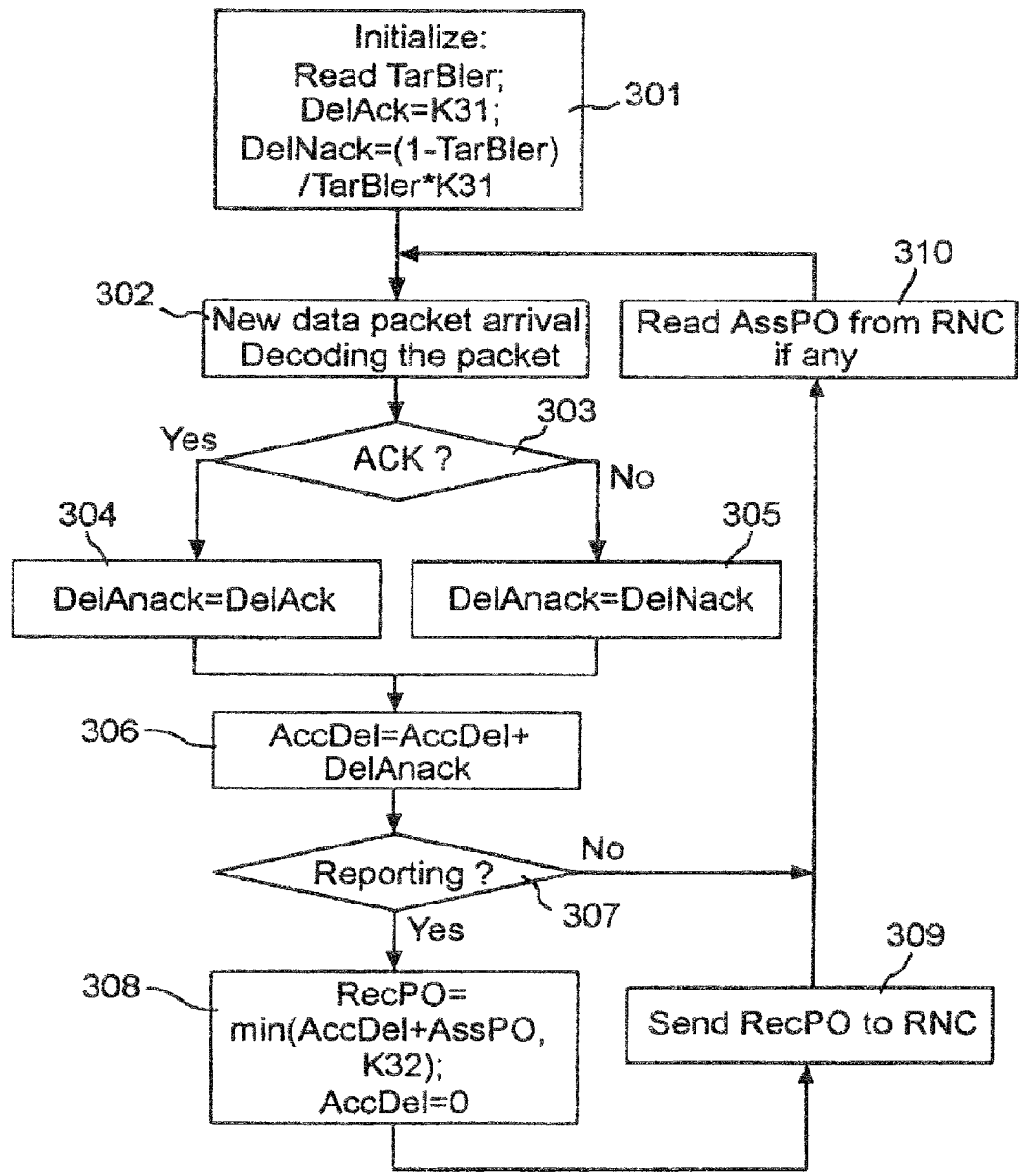
FIG. 3 is a flow chart of the base station procedure of calculating a required power offset.

The following is a detail description of a process performed in power offset estimator 214 in base station 20. FIG. 3 is a flow chart illustrating the description presented in the following. In the Figure, "TarBler", "DelAck" and "DelNack" represent a target error rate, a positive adjustment factor for the power offset, and a negative adjustment factor for the power offset, respectively. "DelAnack", "AccDel", "RecPO" and "AssPO" represent an adjustment factor, an accumulated adjustment factor, a required power offset, and an assigned power offset, respectively. "K31" is a given value of DelAck and "K32" is a maximum allowed power offset.

Initially, in step 301, the target error rate of the EUDCH data flow is set as well as an adjustment factor for the power offsets. The adjustment factor should be sufficiently large to guarantee fast convergence of the adjustment. After the EUDCH data packet is decoded by the base station, at step 302, a required power offset is adjusted by the reception status of the data packet, at steps 303, 304, 305 and 306. This adjustment is accumulated over a period of time and the required power offset is calculated as follows, at steps 306, 307, 308:

$$PO_{REC} = \min\left(PO_{EDCH} + \sum_{t \in T_{MSR}} \Delta_{anck}(t), PO_{MAX}\right) \quad (2)$$

The $PO_{REC}$ is the calculated required power offset of EUDCH during measurement period $T_{MSR}$. The measurement duration and the maximum upper limit of power offset $PO_{MAX}$ are predefined by the radio network controller. The maximum upper limit $PO_{MAX}$ guarantees a defined dynamic range of the power offset for the EUDCH data flow. Furthermore, the adjustment term $\Delta_{anck}$ is decided based on of the reception status of EUDCH such that:

$$\Delta_{anck}(t) = \begin{cases} \Delta_{ACK} & \text{if successful transmission}(ACK) \\ -\Delta_{NACK} & \text{if not successful transmission}(NACK) \end{cases} \quad (3)$$

Note that the adjustment in Equation 2 can be selectively performed. For example, if there is no data reception or there is retransmission at time t, then $\Delta_{anck}(t)=0$. The adjustment parameters, $\Delta_{ACK}$ and $\Delta_{NACK}$, can be defined by the following equation:

$$(1-P_{nack})\Delta_{ACK} = P_{nack}\Delta_{NACK} \quad (4)$$

where $P_{nack}$ is the target block error rate (BLER).

After the base station performs the power offset estimation procedure describe above, it, then, reports the calculated required power offset to the radio network controller, at step 309.

Concretely, power offset estimator 214 forwards reported power offset 227 to radio resource controller 219 which signals the power offset to power offset controller 204 in mobile station 10 as indicated by arrow 226. If the assigned power offset is set in the radio network controller, the base station reads the assigned power offset from the radio network controller, at step 310. Then the control of procedure goes back to step 302.

Figure 4:
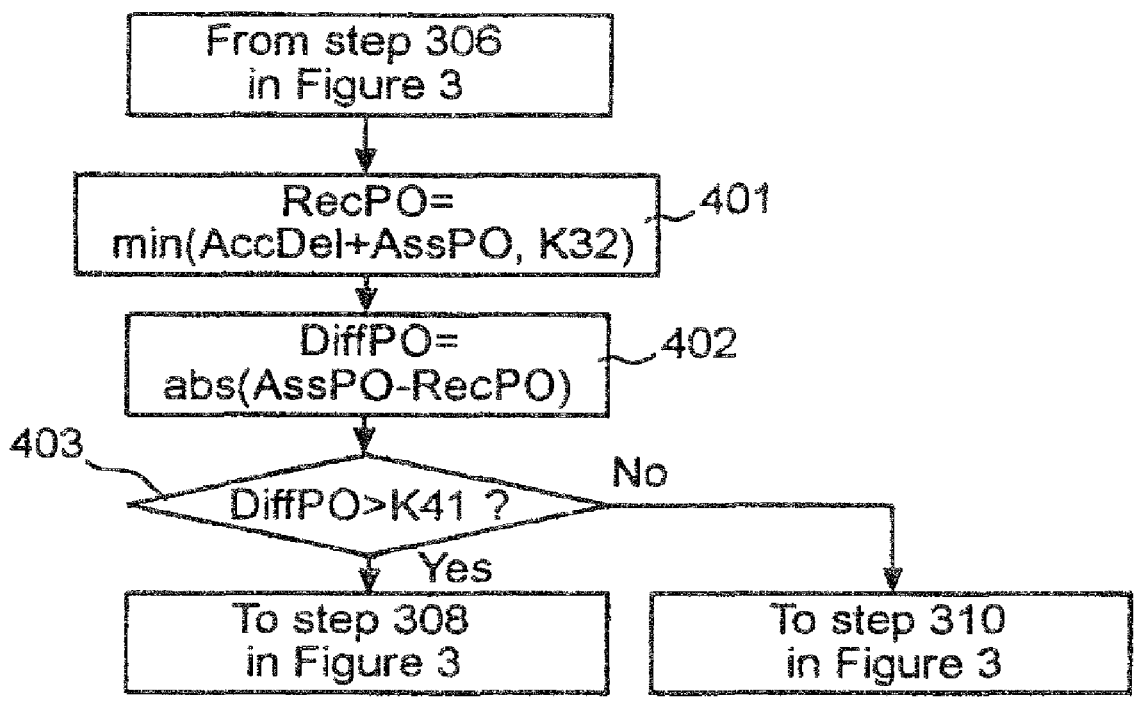
FIG. 4 is a flow chart of the base station procedure of sending the required power offset.

Although the frequent reporting of the required power offset to the radio network controller is beneficial, its associated signaling overhead can be significant. To reduce the signalling overhead, an event-driven signaling is described in the following. FIG. 4 illustrates a detail example of the event-driven signaling procedure. In FIG. 4, "DiffPO" represents a difference of the power offsets, and "K41" is a threshold for the power offset reporting.

After the calculation of the required power offset is carried out at step 401, the base station calculates a difference between the calculated power offset and the assigned power offset, at step 402. If the difference is greater than a predefined reporting threshold, base station 20 sends the calculated power offset to radio network controller 30, at step 403.

$$\log_{10}|PO_{RNC} - PO_{REC}| > PO_{REPTH} \quad (5)$$

where $PO_{RNC}$ and $PO_{REC}$ are the current and required power offsets respectively while $PO_{REPTH}$ is a threshold for the power offset reporting. The predefined reporting threshold can be signaled from the radio network controller to the base station.

Figure 5:
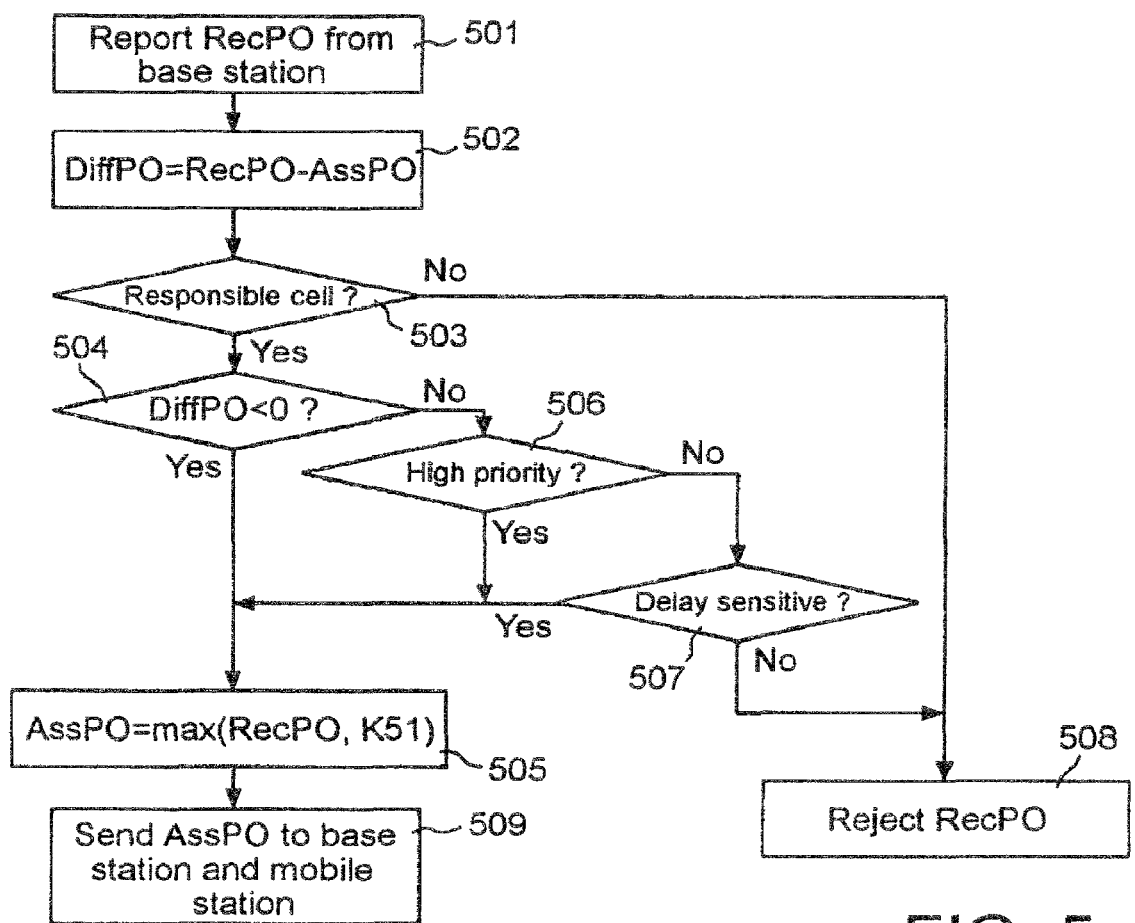
FIG. 5 is a flow chart of the radio network controller procedure of assigning a new power offset.

From the method described so far, the radio network controller can have reporting from a base station on the required power offset of the EUDCH data flow. From this recommendation from the base station, the radio network controller can decide a new power offset of the EUDCH data flow. A detail procedure of the radio network controller assigning the new power offset is described in what follows:

A flow chart of this radio network controller procedure is given in FIG. 5. Firstly, the radio network controller receives a required power offset from a group of base stations receiving the EUDCH data flow, at step 501, and calculates a difference between the newly required power offset and the currently assigned power offset, at step 502. Then the radio network controller checks, at step 503, whether the required power offset is sent by a responsible base station (serving base station) which receives EUDCH data packets most frequently than other base stations. If not the responsible base station, the radio network controller rejects the reported required power offset, at step 508. If the power offset is sent by the responsible base station, the radio network controller checks whether the required power offset is smaller than the currently assigned power offset, at step 504. If so, the radio network controller accepts the recommendation and sends the newly assigned power offset to the base stations, at steps 505, 509. If not, the radio network controller accepts the recommendation if the data flow is a high priority flow or delay sensitive, at steps 506, 507. Otherwise, the radio network controller rejects the required power offset, at step 508.

In the method described in FIG. 5, the radio network controller is utilizing priority and delay sensitivity of data flow when it decides to increase the required power offset. The benefit associated with this procedure is that limited total radio resource is prioritized to serve the high priority flow or delay sensitive flow rather than the low priority best-effort flow.

Furthermore in the method described in FIG. 5, the radio network controller accepts the required power offset only from the responsible base station. The benefit of this procedure is to minimize the required power offset by selecting the best quality base station hence increasing capacity of the uplink packet transmission.

Figure 6:
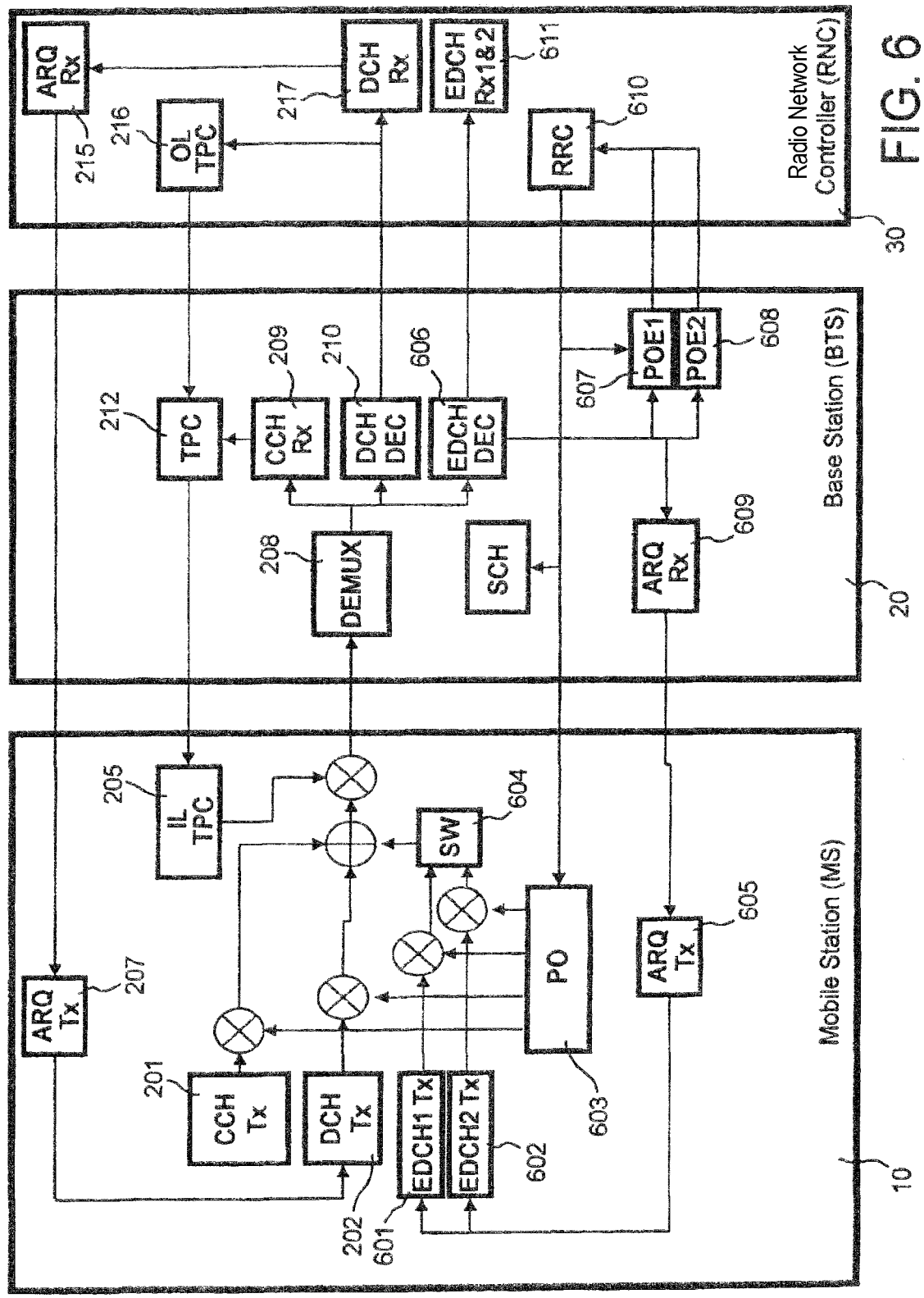
FIG. 6 is a block diagram illustrating a system according to another embodiment of the present invention.

Next, another embodiment of the present invention will be described. As an example, aforementioned EUDCH is considered hereafter. FIG. 6 illustrates another possible realization of the system according to the present invention. This illustrated system is an extension of the previous realization of system shown in FIG. 2. The difference between two systems are explained in the following:

There are two EUDCH data flows in addition to one DCH data flow. The previous system in FIG. 2 has only one EUDCH data flow. Therefore, the system in FIG. 6 is an extended system for the case when there are more than one EUDCH data flows transmitted in an uplink. Each EUDCH data flow may have a different requirement on a target error rate due to different Quality of Service (QoS) requirement. To support different QoS for each data flow, in this system, the transmitted data packet from each data flow is separately encoded.

Therefore, mobile station 10 shown in FIG. 6 is provided with two EUDCH data transmitters (EDCH1 Tx, EDCH2 Tx) 601, 602 and time multiplexer (SW) 604 for two data flows. The base station is provided with two power offset estimators (POE1, POE2) 607, 608.

Separate power offsets for two EUDCH data flows are used in power offset controller 603 for a DCH data flow and two EUDCH data flows. Instead of using a common power offset for both EUDCH data flows, in this embodiment, the separate power offsets are used in order to control the target error rate of each EUDCH data flow separately. Hence controlling separate QoS of each EUDCH data flow is possible by use of the separate power offset for each flow.

Time multiplexing is used for transmitting two EUDCH data flows. The switching at time multiplexer 604 is performing selection for transmission from two data flows. For example, switching can perform round robin selection from between two data flows when both flows have sufficient data waiting for transmission, in order to separately control the target error rate of each data flow.

Based upon receiving the transmitted EUDCH data flow, base station 20 performs decoding of the EUDCH data flow at EUDCH decoder 606. Successfully decoded data is forwarded to RNC 30 and the reception status of the data flow is reported to power offset estimators 607, 608. As described above, there are two separate power offset estimators 607, 608 in the base station for each EUDCH data flow. Hence the reception status of the EUDCH data flow is updated to the corresponding power offset estimator only. For example, if the base station receives the first EUDCH data flow, the power offset estimator updating the power offset of the first EUDCH data flow will calculate new level of the required power offset using the reception status. The calculation is carried out by the same procedure illustrated in FIG. 3.

Both base station 20 and mobile station 10 are controlling retransmission of data flow by a master controller, i.e., ARQ transmitter 605, and a slave controller, i.e., ARQ receiver 609. ARQ transmitter 605 functions as a retransmission master controller at the mobile station handling both EUDCH data flows, and ARQ receiver 609 functions as a retransmission slave controller at the base station handling both EUDCH data flows. To support separate retransmission of two EUDCH data flow, retransmission information consists of the reception status and a corresponding data flow identification. The identification can be sent explicitly or it can be reduced implicitly from fixed timing between the uplink data transmission and the downlink control data transmission.

The separate power offsets for two EUDCH data flows calculated by the base station are reported to RNC radio resource controller 610. Based on the reported power offset, RNC 30 makes decision on the power offset of each EUDCH data flow in a same way explained in FIG. 5. For example, if two EUDCH data flows have different priority and base station 20 reports a higher power offset for both data flows, then RNC can increase only the power offset of the higher priority data flow while rejecting that of the lower priority one. Then, RNC signals the newly assigned power offsets to the mobile station and base station(s).

Key aspect of the proposed realization in FIG. 6 is to employ two separate closed control loops for each EUDCH data flow. The base station calculates the required power offset for each data flow separately, it reports the power offsets to the radio network controller separately, and then the radio network controller makes the decision on new power offsets also separately. This separate closed loop power offset control enables the separate control of QoS of each data flow hence the data flow with high priority, for example, can be guaranteed more uplink power than that of lower priority. Note that this proposed system can be also extended for a case of more than two EUDCH data flows.

The invention claimed is:

1. A method of controlling transmission power in a mobile communication system which comprises a plurality of mobile stations, a plurality of base stations, and a radio network controller, said method comprising steps of:

transmitting, using a mobile station, a first data flow to a base station of a first group with a first power offset to a pilot signal, transmitting a second data flow to a base station of a second group, and transmitting, in addition to said first data flow, a third data flow to said first group with a second power offset to said pilot signal;

choosing, using said mobile station, transmission of either said first or said third data flow in a time interval but not simultaneously together;

controlling, using said base station of said first group, retransmission of both said first data flow and said third data flow, separately calculating required level of said first and second power offsets based on an occurrence of retransmission of said first and third data flows, respectively, and signaling said two required levels to said radio network controller;

receiving, using said base station of said second group, the second data flow, and sending the received second data flow to said radio network controller;

combining, using said radio network controller, the second data flow sent from said base station of said second group, controlling said pilot signal power based on a reception error of said second data flow, calculating said first and second power offsets based on said signaled required levels of the first and second power offsets, respectively, and signaling said calculated first and second power offsets to said mobile station; and updating, using said mobile station, the first and second power offsets to said signaled first and second power offsets, respectively.

2. The method according to claim 1, wherein said first data flow and said third data flow have distinct Quality of Service (QoS).

3. The method according to claim 2, wherein the Quality of Service includes priority and delay sensitivity.

* * * * *